United States Patent [19]

Goetz, Jr.

[11] 4,425,730

[45] Jan. 17, 1984

[54] HYDRODYNAMIC FISHING LURE

[76] Inventor: Edward E. Goetz, Jr., 4611 Webberdale, Holly, Mich. 48442

[21] Appl. No.: 291,287

[22] Filed: Aug. 10, 1981

Related U.S. Application Data

[63] Continuation-in-part of Ser. No. 36,576, May 7, 1979, abandoned.

[51] Int. Cl.³ .............................................. A01K 85/00
[52] U.S. Cl. .................. 43/42.11; 43/42.13; 43/42.43
[58] Field of Search ............ 43/42.11, 42.13, 42.39, 43/42.42, 42.43, 43.2, 43.6

[56] References Cited

U.S. PATENT DOCUMENTS

| | | | |
|---|---|---|---|
| 1,513,011 | 10/1924 | Russell | 43/43.2 |
| 3,137,264 | 6/1964 | Brainard | 114/244 |
| 3,500,573 | 3/1970 | Hudson | 43/42.11 |
| 3,690,029 | 9/1972 | Pobst | 43/42.43 |
| 3,750,325 | 8/1973 | Feltman | 43/42.14 |

Primary Examiner—Nicholas P. Godici
Assistant Examiner—Peter B. Martine
Attorney, Agent, or Firm—Hauke & Patalidis

[57] ABSTRACT

An improved artificial fishing lure for top water or surface fishing of the general type sometimes referred to as the "buzzbait" variety. The body of the lure has a forward section of hull shape provided with at least one keel or fin extending downwardly at the trailing end of the hull. The rearward section of the lure body is a solid shank with a hook attached at its trailing end and suitable for affixing various types of artificial or natural baits. The body of the lure has a flat surface forming a bend at an angle of 120° to 170°. The keel or fin, centered beneath the bend at the trailing end of the hull, has a circle painted on each side so as to imitate an eye. Two bulges are disposed in the lower surface of the lure body between the bend and the fin for the purpose of adding stability to the lure body. A loop is affixed proximate the forward end of the hull for attaching the end of a fishing line. The loop is formed with an upper leg disposed rearwardly at an angle. The upper leg may be provided with a spinner assembly.

13 Claims, 10 Drawing Figures

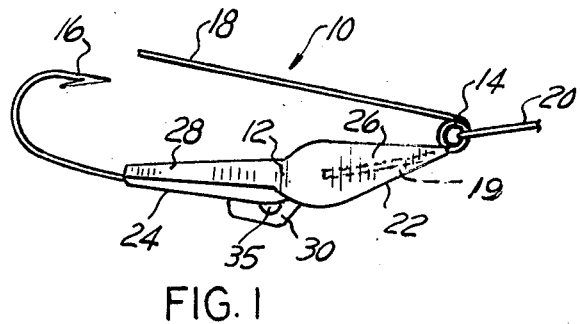
FIG. 1
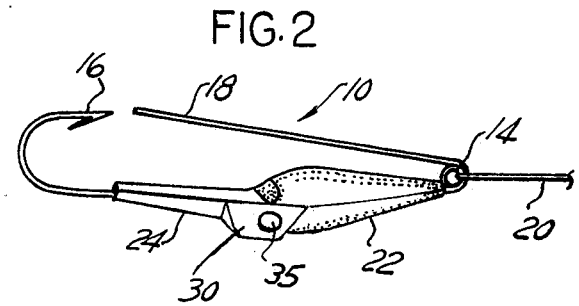
FIG. 2
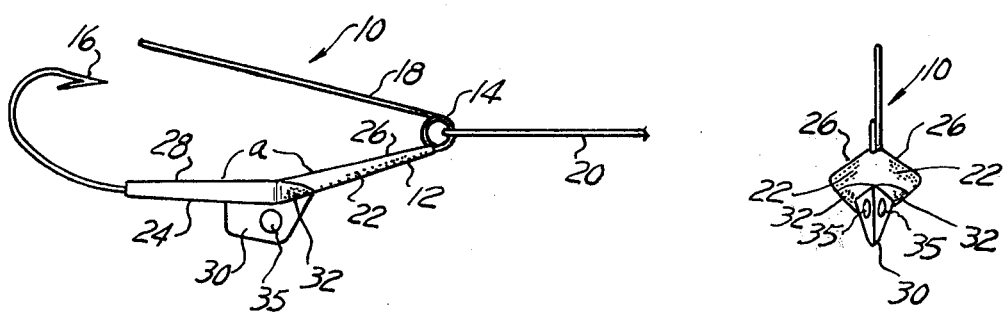
FIG. 3
FIG. 4
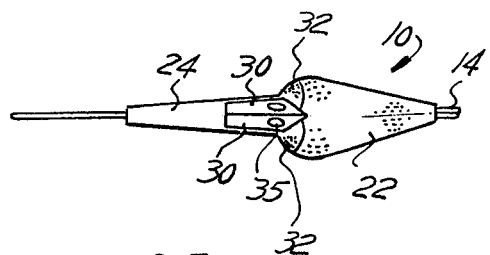
FIG. 5
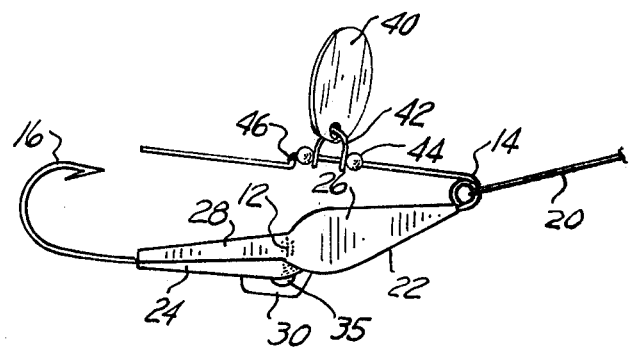
FIG. 6

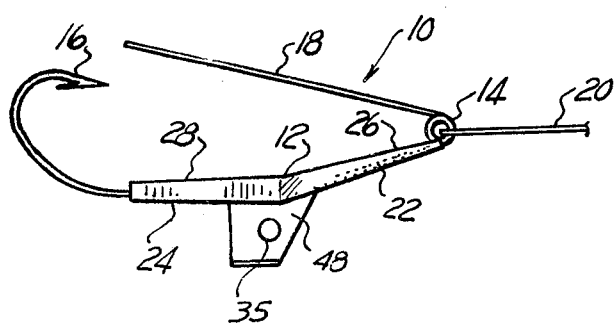
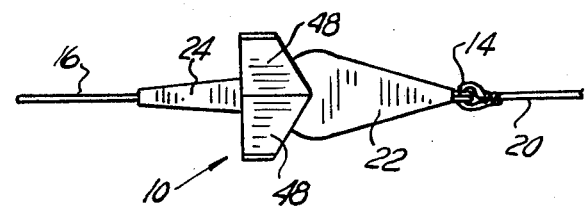
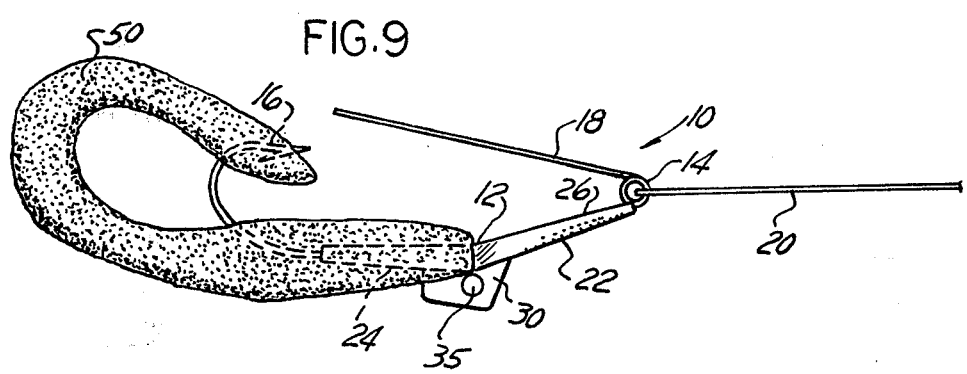
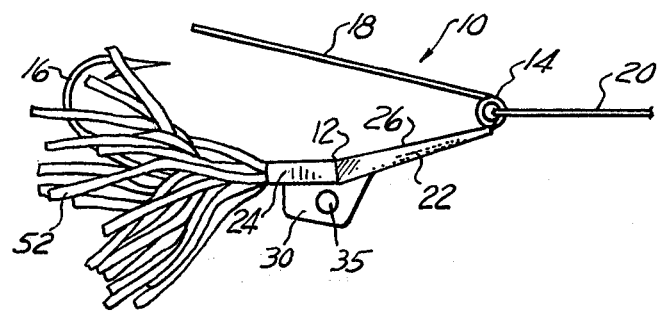

HYDRODYNAMIC FISHING LURE

CROSS REFERENCE TO RELATED APPLICATIONS

This application is a continuation-in-part of Application Ser. No. 036,576 filed May 7, 1979, now abandoned.

BACKGROUND OF THE INVENTION

Many attempts have been made to improve the attractiveness of artificial lures used by sport fishermen so as to increase the likelihood of catching fish. Various top water or surface artificial lures have been developed, especially of the "buzzbait" type used primarily for bass, pike and muskie fishing.

The conventional "buzzbait" top water or surface lure typically consists of a substantially V-shaped vertically disposed wire bracket, to the upper leg of which is attached a wobble plate, spinner or propeller and to the second or lower leg of which is attached the lure body and the hook, together with a skirt or hackle of feathers or other live bait imitation to assist in the lifelike appearance of the lure. This type of lure operates most effectively when it is stable, i.e. does not roll over on its side, because while it remains upright the hook is in the best position to penetrate the roof of the mouth of a fish sampling the "bait". Another desirable feature of a "buzzbait" lure is the ability to move through the water slowly without sinking. If retrieved slowly, a lure tempts a catchable fish for a longer time and the fisherman needs to recast his line less often.

In the past the lure bodies used in "buzzbait" lures have been intentionally shaped to resemble various insects or fish and therefore have been shaped as teardrops, torpedoes, cylinders or spoons. Unfortunately, however, the hydrodynamics of these configurations result in somewhat unstable lure assemblies which tend to sway easily and which descend rapidly or uncontrollably at low retrieval speeds. For example, U.S. Pat. No. 3,500,573 discloses a "buzzbait" lure having a torpedo-shaped body, the obvious tendency of which is to sink at slow speeds because of its mass being centered forward and distributed over a width relatively narrow in relation to the length of the lure body. What is needed, therefore, is a lure body decorated like an insect or other live bait but having a shape with better weight distribution and other hydrodynamic characteristics such that the assembly will have less of a tendency to turn on its side and will, at low retrieval speed, descend more slowly and predictably through the water.

SUMMARY OF THE INVENTION

The present invention is an improved lure of the "buzzbait" type having a forward hull section and a rearward shank. Its several novel features work in combination to provide improved hydrodynamic characteristics over lures presently available.

The lure body has a forward hull portion roughly dish-shaped and convex. As the lure moves through the water the hull creates upward lift thereby allowing retrieval of the lure, without sinking, at slower speeds than would otherwise be possible. A loop for attaching a fishing line is proximate the forward end of the hull so that the tug of the line does not cause the lure to spin along its horizontal axis. In addition, bulges are placed in the underside of the lure body so as to achieve a pontoon-like, stabilizing effect. At least one fin extends downwardly from the trailing end of the hull, further inhibiting undesirable yaw or roll as the lure moves through the water.

Two circles, resembling eyes, may be painted onto the downwardly extending fin, one on each side, or, in an alternative dual fin configuration, the circles may be placed so that one is on each exterior surface of the two fins. Artificial baits of colorful plastic, for example, shaped in the form of a worm, or natural baits, can be attached to the shank of the lure body by impaling the bait with the hook of the lure.

Other objects and advantages of the present invention will become apparent to those skilled in the art when the following description of the best mode contemplated for carrying out the invention is read in conjunction with the attached drawings wherein like reference numerals refer to like components throughout and wherein:

BRIEF DESCRIPTION OF THE DRAWINGS

FIG. 1 is a top perspective view of a structural example of a lure body according to the present invention;

FIG. 2 is a bottom perspective view thereof;

FIG. 3 is a side-elevational view thereof;

FIG. 4 is a front elevational view thereof;

FIG. 5 is a bottom plan view thereof;

FIG. 6 is a view similar to FIG. 1, but showing a modification thereof;

FIG. 7 is a view similar to FIG. 3, but showing a modification thereof;

FIG. 8 is a bottom plan view thereof;

FIG. 9 is a view similar to FIG. 1, but showing the lure of the invention provided with an artificial bait; and FIG. 10 is a view similar to FIG. 1, but showing the lure of the invention provided with a skirt to disguise the hook.

DETAILED DESCRIPTION OF THE PREFERRED EMBODIMENT

Referring now to the drawings and more particularly to FIGS. 1-5 which illustrate an example of a lure 10 according to the present invention, the lure 10 is in the form of an elongated body 12 provided with a loop 14 at its leading edge and a hook 16 at its trailing edge, and a leg 18 projecting rearwardly at an angle over the body 12 to proximate and slightly above the tip of the hook 16 such as to provide an inclined guard reducing the tendency of the hook 16 to be caught in underwater grass or weeds.

In the illustrated lure 10, the loop 14 is made by twisting a length of spring wire, for example, in the middle one or two times so as to form the coil-shaped loop 14. A portion of the wire constitutes the leg 18 of the lure 10 and the other portion 19 is embedded in the lure body 12, preferably during the process of molding the lure body 12, so that the loop 14 dividing the two portions 18, 19 is proximate the forward end of the lure body 12.

The placement of the loop 14 proximate the leading end of the body 12 of the lure 10 eliminates any tendency that the lure may have to spin along its horizontal axis as it is pulled through the water by a fishing line 20 attached to the loop 14. Conventional lures place the loop 14 away from the body 12 of the lure 10, typically at the end of an intervening section of wire rod, or the like; thus reducing stability and causing the lure to roll as it is towed.

The design of the lure body 12 itself also contributes to the stability of the lure 10. As shown in FIGS. 1-3 the lure body 12 is composed of a forward hull 22 and a rearward shank 24, both having flat surfaces shown as 26 and 28 respectively. A keel or fin 30 extends downwardly from the trailing end of the hull 22.

The advantage of the forward hull 22 design is that it allows the depth at which the lure 10 is submerged to be readily controlled as a function of the speed of retrieval. As the lure 10 is pulled through the water, the water is displaced upward and backward by the hull 22 in such a manner that the lure body 12 is not subject to excessive yaw or roll. In addition, the relatively wide hull 22 creates upward lift which keeps the lure body 12 nearer the surface of the water at lower retrieval speeds than with conventional lures having cylindrical or relatively narrow bodies.

It has been determined experimentally that the hull 22 of the lure body 12 best performs its function where a bend forming an angle a, FIG. 3, exists between the upper surface 26 of the forward hull 22 and the upper surface 28 of the rearward shank 24. Further, it has been determined that the hull 22 works best if the angle a is chosen between 120 degrees and 170 degrees.

Also adding to the stability of the lure body 12 is the keel or fin 30 which slopes downwardly from the trailing end of the hull 22, as best shown at FIGS. 2 and 3. The fin 30 is a substantially vertical, streamlined, symmetrical airfoil as further shown in FIGS. 4 and 5.

Two outward bulges 32 in the lower surface of the lure body 12 further improve its performance. The bulges 32, as shown in FIGS. 3-5, are disposed one on each side of the lure body, above the keel 30 and beneath the angle a formed by hull and shank upper surfaces 26 and 28. The bulges 32 perform an additional stabilizing function similar to that achieved by pontoons, i.e., they increase lateral stability of the lure 10.

Referring now to FIG. 6, the present invention is shown with a spoon-shaped wobble plate 40 attached to the upper leg 18 of the lure 10 by a U-shaped connector 42 attached freely to the leg 18 between a pair of beads 44, a bend 46 being formed in the leg 18 for preventing the beads 44 and the U-shaped connector 42 from slipping off the leg 18. Other alternative configurations, not shown, include spinner assemblies or windmilling propellers attached at the end of the upper leg 18, or in the middle, by retainer beads or swivel connectors, as is well known in the art. As the lure 10 is pulled through the water, the wobble plate 40, for example, establishes itself at a depth depending on the speed of retrieval, with the lure body 12 disposed below the wobble plate 40. If the line is slackened, the wobble plate 40 acts to some extent as the rotor of an autogyro, slowing the descent and sinking of the lure 10 in the water. When retrieving is resumed, the lure is pulled through the water at any appropriate depth, according to the speed of retrieval, the higher the speed the closer to the surface of the water.

FIGS. 7 and 8 illustrate a modification of the present invention wherein a pair of fins 48 slope downwardly from the trailing end of the hull 22 of the lure body 12. The fins 48 are disposed symmetrically at an angle to each other so as to form an inverted V-structure.

The lure body 12 is preferably cast of plastic or metal integrally with the fin 30, FIGS. 1-6, or fins 48, FIGS. 7 and 8. The lure body 12 is preferably painted or coated with a colorful plastic material, and it may be further decorated, for example, with a pair of circles resembling eyes 35, one on each side of the fin 30 or one each on the exterior side of each of the fins 48 in the modification of the invention illustrated at FIGS. 7 and 8. As shown at FIG. 9, the lifelike appearance of the lure 10 can be further enhanced by the inclusion of a colorful artificial bait 50, preferably made of pliable plastic and formed to fit tightly over the shank 24 of the lure body 12. Alternatively, live or other natural baits can be used with the lure 10.

As an alternative, an appropriate "feather", hackle or skirt—for example the skirt 52 illustrated at FIG. 10, can also be affixed to the lure body 12 to disguise the hook and further contribute to the overall attractiveness of the lure assembly 10.

The foregoing detailed description of examples of structures, given for illustrative purposes only and not by way of limitation, represents the best mode contemplated at the time of filing for carrying out the present invention.

What is claimed is as follows:

1. A top water fishing lure comprising a lure body and an upper leg disposed above the lure body, said upper leg being formed integrally with a coil-shaped loop and a lower leg, said upper leg projecting rearwardly at an angle from the leading edge of the lure body, said lower leg being embedded within the lure body and said loop being disposed proximate the leading edge of the lure body for attaching a fishing lure, a hook affixed proximate the trailing edge of the lure body, said lure body further comprising a forward hull portion formed integrally with a rearward shank portion, at least one fin extending downwardly from the underside of said lure body at the trailing end of said hull portion and two outward bulges disposed on the underside of said lure body, wherein said lure body is configured to be relatively massive proximate the center thereof, said forward hull portion and rearward shank each have separate flat upper surfaces, said flat upper surfaces are joined at an angle of about 120° to 170°, and said bulges are located each on one side of said fin and beneath said angle joining said flat upper surfaces.

2. The improvement of claim 1 wherein said integrally formed upper leg, coil-shaped loop and lower leg are made of a length of spring wire.

3. The improvement of claim 1 wherein said lure body is made of painted metal.

4. The improvement of claim 1 wherein said lure body is made of metal coated with colorful plastic material.

5. The improvement of claim 1 wherein said lure body is made of plastic.

6. The improvement of claim 1 wherein said fin is a substantially vertical streamlined airfoil.

7. The improvement of claim 1 comprising two fins extending downwardly from the underside of the lure body at the trailing end of said hull portion and disposed symmetrically at an angle to each other so as to form an inverted V-shaped structure.

8. The improvement of claim 1 wherein a circle is painted on each lateral side of said fin.

9. The improvement of claim 7, wherein a circle is painted on the exterior side of each of said fins.

10. The improvement of claim 1 wherein a bait is attached to the rearward shank.

11. The improvement of claim 1 wherein a skirt or hackle is attached to the rearward shank.

12. The improvement of claim 1 wherein a wobble plate is attached to the upper arm.

13. The improvement of claim 1 wherein said bait is made of colorful plastic.

* * * * *